United States Patent
Rao et al.

(10) Patent No.: US 6,594,113 B2
(45) Date of Patent: Jul. 15, 2003

(54) SLIDER WITH FURROWS FOR FLUSHING CONTAMINANTS AND LUBRICANT

(75) Inventors: Ram M. Rao, Roseville, MN (US); Scott E. Ryun, Prior Lake, MN (US); Anthony P. Sannino, Longmont, CO (US); Deborah S. Schnur, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 8 days.

(21) Appl. No.: 10/001,661

(22) Filed: Oct. 18, 2001

(65) Prior Publication Data

US 2002/0075599 A1 Jun. 20, 2002

Related U.S. Application Data

(60) Provisional application No. 60/257,132, filed on Dec. 20, 2000.

(51) Int. Cl.[7] .............................................. G11B 5/60
(52) U.S. Cl. .............................. 360/235.8; 360/236.3; 360/235.7
(58) Field of Search ............................ 360/235.4, 235.5, 360/235.7, 235.8, 236.3, 236.5, 236.6, 237

(56) References Cited

U.S. PATENT DOCUMENTS

| 4,212,044 | A | | 7/1980 | Plotto ........................ 360/103 |
|---|---|---|---|---|
| 4,486,798 | A | | 12/1984 | Feliss et al. ................ 360/103 |
| 4,510,541 | A | | 4/1985 | Sasamoto ..................... 360/97 |
| 5,467,238 | A | | 11/1995 | Lee et al. .................... 360/128 |
| 5,751,517 | A | | 5/1998 | Agarwal ..................... 360/103 |
| 5,831,792 | A | * | 11/1998 | Ananth ..................... 360/236.6 |
| 6,233,118 | B1 | | 5/2001 | Boutaghou et al. ...... 360/235.4 |
| 6,424,493 | B1 | * | 7/2002 | Matsumoto et al. ..... 360/235.5 |
| 6,449,126 | B1 | * | 9/2002 | Dorius et al. ............ 360/236.3 |

* cited by examiner

*Primary Examiner*—Robert S. Tupper
(74) *Attorney, Agent, or Firm*—Kinney & Lange, P.A.

(57) ABSTRACT

A slider is used for supporting a transducing head proximate a rotating disc. The slider includes a slider body having a disc opposing face bounded by a leading edge, a trailing edge and first and second side edges. The slider body has a longitudinal axis. An air bearing surface is defined on the disc opposing face. A furrow is positioned on the disc opposing face for flushing contaminants towards the trailing edge of the slider body.

21 Claims, 7 Drawing Sheets

SLIDER WITH FURROWS FOR FLUSHING CONTAMINANTS AND LUBRICANT

CROSS-REFERENCE TO RELATED APPLICATION(S)

This application claims priority from Provisional Application No. 60/257,132, filed Dec. 20, 2000, for "SLIDER WITH FURROWS FOR FLUSHING CONTAMINANTS AND LUBRICANTS" by Ram M. Rao, Scott E. Ryun, Anthony P. Sannino, and Deborah S. Schnur.

BACKGROUND OF THE INVENTION

The present invention relates to an air bearing slider carrying a transducing head in a disc drive. More particularly, it relates to capturing contaminants on the slider and expunging the contaminants from the slider.

Air bearing sliders have been extensively used in disc drives to appropriately position a transducing head above a rotating disc. In most high capacity storage applications, when the disc is at rest, the air bearing slider is in contact with the disc. During operation, the disc rotates at high speeds, which generates a wind of air immediately adjacent the flat surface of the disc. The wind acts upon the lower air bearing surface of the slider and generates a lift force directing the slider away from the disc and against a load beam causing the slider to fly at an ultra-low fly height above the disc. A slider is typically mounted on a gimbal and load beam assembly which biases the slider toward the rotating disc, providing a preload force opposite to the lift force acting on the air bearing surface of the slider. In negative pressure sliders, the wind also acts upon a portion of the air bearing surface of the slider to generate a suction force. The suction force counteracts the lift force by pulling the slider back toward the surface of the disc. For the slider to maintain the ultra-low flying height above the surface of the disc, the lift force must be balanced with (and greater than) the preload and suction forces.

As disc storage systems are designed for greater and greater storage capacities, the density of concentric data tracks on the disc increases (that is, the size of data tracks and radial spacing between data tracks decreases). One aspect of achieving higher data storage densities in the disc is operating the air bearing slider at ultra-low flying heights. Furthermore, the increase in data storage densities requires that the air bearing gap, or head media spacing (HMS) between the transducing head carried by the slider and the rotating disc be reduced.

As the HMS has decreased, increased accumulation of contaminants, such as lubricant (lube), and debris on the slider has occurred. Lubricant is typically applied to the disc to prevent corrosion. Lube displaced by evaporation or head disc contact collects on the slider body. The collected lube typically migrates across the surface of the slider and accumulates in a location where airflow across the slider tends to produce a stagnation point. Lube accumulation on the slider results in flyability and stiction problems. Lube accumulation on the slider induces loss of fly height resulting in intermittent contact between the slider and the disc until finally a crash occurs between the two. Additionally, lube accumulated on the slider and lube on the disc create a friction between the slider and the disc, and the lube acts as an adhesive between the two. When the disc begins spinning, the motor does not have enough torque to overcome the stiction force between the disc and the slider, thereby resulting in poor takeoff performance or the inability of the slider to takeoff from the disc.

Particle contamination on the slider results in loss of data or a skip write (or head bounce). Fly height of the slider is typically less than 0.5 microns, however particle size can be greater than 0.5 microns. During particle contamination, particles accumulate on the slider and either embed in the disc surface or create a bump on the disc surface. A particle embedded in the disc surface causes data to be lost or results in a skip write. A particle forming a bump on the disc results in a head bounce or the particle will become further embedded in the disc. During a head bounce, the slider contacts the bump, bounces upward and stops modulating, thereby preventing the slider from reading or writing to or from the disc.

In the past attempts at contaminant mitigation have been restricted to a center pad adjacent a trailing edge of the slider. Furthermore, typically these attempts displace the subambient pressure regions on the slider and increase sensitivity to manufacturing variations. Some other means include using a second head to clean the disc. However, a second head adds manufacturing costs to the disc drive. There is a need in the art for a slider with features that capture contaminants and expel them from the slider without displacing subambient pressure regions, with the ability to capture and flush contaminants from many regions of the slider and not increase the cost of manufacturing.

BRIEF SUMMARY OF THE INVENTION

The present invention relates to a slider for supporting a transducing head proximate a rotating disc. The slider includes a slider body having a disc opposing face bounded by a leading edge, a trailing edge and first and second side edges. The slider body has a longitudinal axis. An air bearing surface is defined on the disc opposing face. A furrow is positioned on the disc opposing face for flushing contaminants towards the trailing edge of the slider body.

In one preferred embodiment of the invention, a first side arm and a second side arm are recessed from the disc opposing face and extend from the furrow. The side arms flush contaminants into the furrow and thereby towards the trailing edge of the slider body.

In another preferred embodiment of the invention, first and second side rails are positioned substantially along the first and second side edges of the slider body. A first side furrow is disposed in the first side rail and a second side furrow is disposed in the second side rail. The side furrows flush contaminants from the disc opposing face of the slider body.

DETAILED DESCRIPTION

Figure 1:
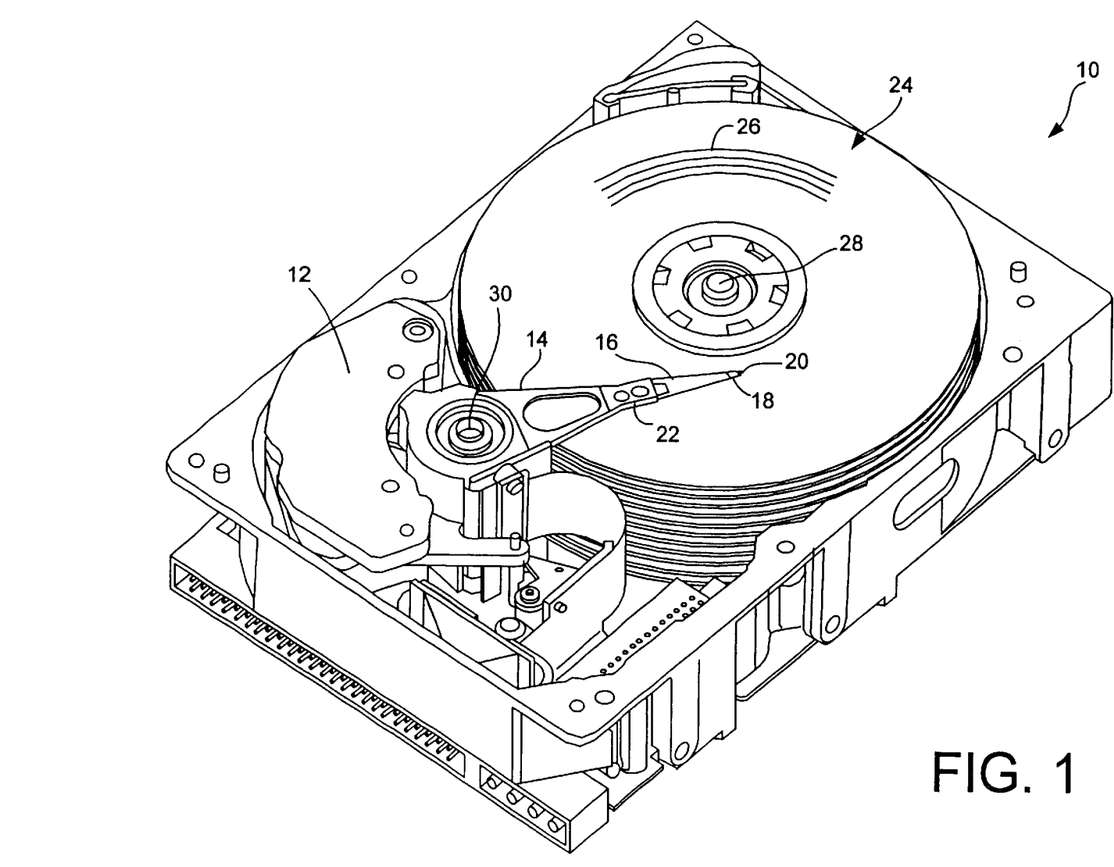
FIG. 1 shows a top perspective view of a disc drive actuation system for positioning a slider over tracks of a disc.

FIG. 1 shows a top perspective view of a disc drive actuation system 10 for positioning a transducing head (shown in FIG. 2) over a track of a disc as known in the prior art. The actuation system 10 includes a voice coil motor (VCM) 12, an actuator arm 14, a suspension 16, a flexure 18, and a slider 20. Slider 20 is connected to the distal end of the suspension 16 by the flexure 18. Suspension 16 is connected to actuator arm 14 at a head mounting block 22, while actuator arm 14 is coupled to VCM 12. As shown on the right side of FIG. 1, the disc drive assembly includes a disc 24, having a multiplicity of tracks 26, which rotates about an axis 28. During operation of the disc drive assembly, rotation of disc 24 generates air movement which is encountered by slider 20. This air movement acts to keep slider 20 aloft a small distance above the surface of disc 24 allowing the slider to fly above the surface of disc 24. VCM 12 is selectively operated to move actuator arm 14 around an axis 30 thereby moving suspension 16 and positioning the transducing head (not shown) carried by slider 20 between tracks 26 of disc 24. Proper positioning of the transducing head is necessary for reading and writing data on the concentric tracks 26 of disc 24.

Figure 2:
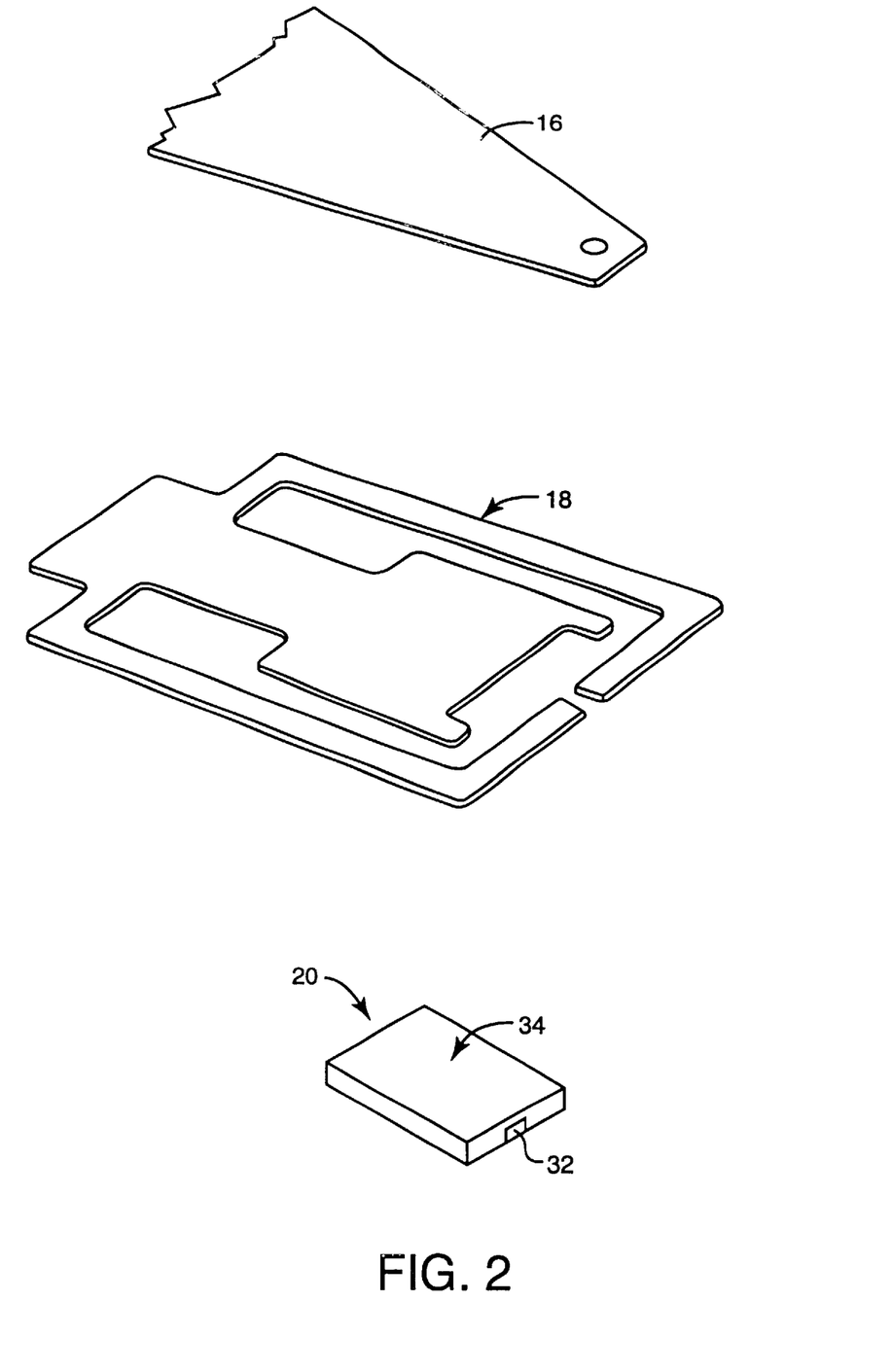
FIG. 2 shows an exploded perspective view of the distal portion of the disc drive actuation system of FIG. 1.

FIG. 2 is an exploded perspective view of the distal portion of a disc drive actuation system 10 (shown in FIG. 1) as known in the prior art. Shown in FIG. 2, from top to bottom is suspension 16, flexure 18, and slider 20 carrying a transducing head 32. Flexure 18 is attached to suspension 16 and slider 20 attaches to a bottom surface of flexure 18. Transducing head 32 is carried by slider 20. Flexure 18 provides a spring connection between slider 20 and suspension 16. Air bearing slider 20 includes a disc opposing face (not shown) and a flexure opposing face 34. Flexure opposing face 34 is attached to the bottom surface of flexure 18. Flexure 18 is configured such that it allows slider 20 to move in pitch and roll directions. Many different types of flexures 18, also known as gimbals, are known to provide the spring connection allowing for pitch and roll movement of slider 20 and can be used with the present invention. Transducing head 32 is carried by slider 20 to write and read data to and from disc 24. In operation suspension 16 and flexure 18 carrying slider 20 are moved together as coarse positioning is performed by VCM 12 (FIG. 1) to move actuator arm 14 (FIG. 1).

Figure 3:
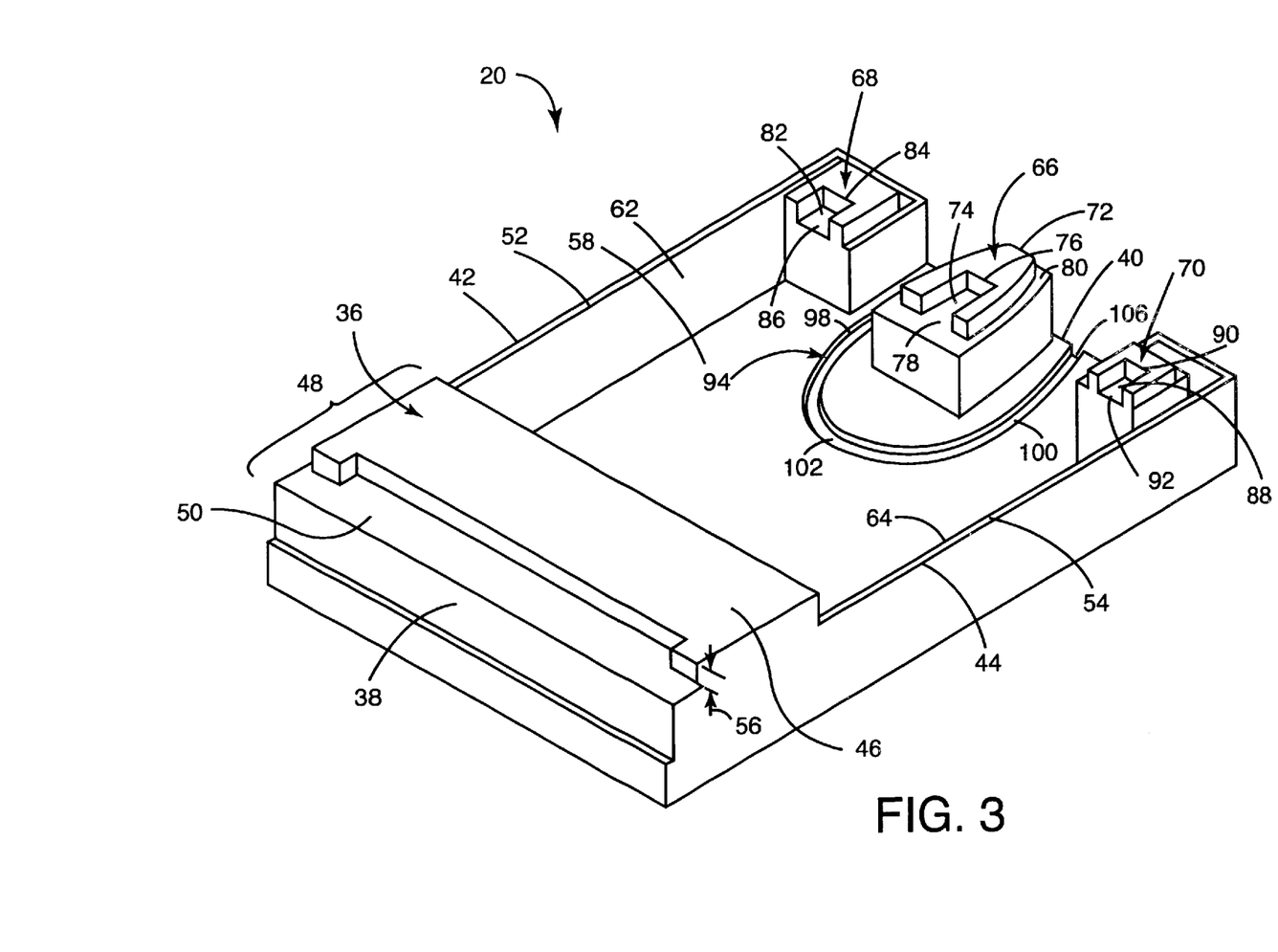
FIG. 3 shows a bottom perspective view of a first embodiment of a slider.

FIG. 3 is a bottom perspective view of a first embodiment of slider 20 which prevents contaminants and debris from accumulating on disc opposing face 36 of the slider. Slider 20 ("the slider body") has a disc opposing face 36 bounded by a leading edge 38, a trailing edge 40, a first side edge 42, and a second side edge 44. Leading edge 38 and trailing edge 40 are substantially parallel to each other, and two side edges 42 and 44 are substantially parallel to each other. Other configurations are possible for the slider body, including trapezoidal shapes. During operation, disc opposing face 36 is directed toward disc 24 (FIG. 1).

The contour of disc opposing face 36 of air bearing slider 20 has a significant affect on the flying characteristics of air bearing slider 20, and various contours have been proposed and used for air bearing sliders. Examples of two of these are included in U.S. Pat. No. 5,062,017 by Strong et al. and U.S. Pat. No. 5,343,343 by Chapin both of which are assigned to Seagate Technology, Inc. and are hereby incorporated by reference. The slider must maintain adequate roll pitch and normal stiffness over the predetermined concentric data track, corresponding to a range of operating speeds, and over a predetermined range of skew angles. The slider must also maintain an ultra-low fly height over disc 24 while the disc drive is in operation.

To accommodate disc storage systems designed for greater storage capacity, the density of concentric data tracks on the disc increases (that is the size of the data track and the radial spacing between the data tracks decreases). One result of achieving higher data storage densities in the disc is the need to operate the air bearing slider at an ultra-low fly height over the disc. The increase in data storage density requires that the head media spacing (HMS), the air bearing gap, between the transducing head carried by the slider and the rotating disc be reduced.

Disc opposing face 36 of slider 20 defines an air bearing surface 46. Air bearing surface 46 is the reference level for slider 20. A cross rail 48 is positioned behind leading edge 38 and extends from first side edge 42 to second side edge 44. Cross rail 48 typically has a height equal to air bearing surface 46, however, a front portion 50 of cross rail 48 is recessed from air bearing surface 46.

A first side rail 52 is positioned adjacent first side edge 42 and a second side rail 54 is positioned adjacent second side edge 44. Side rails 52 and 54 extend from cross rail 48 towards trailing edge 40. First side rail 52 and second side rail 54 are disposed substantially parallel to each other. Side rails 52 and 54 are preferably recessed from air bearing surface 46 at a step depth 56. The step depth is preferably about 0.1 microns to about 0.3 microns. Other embodiments of slider 20 may have side walls at a height equal to air bearing surface 44.

A cavity 58 is positioned on disc opposing face 36. Cavity 58 is recessed from air bearing surface 46 at a cavity depth (shown in FIGS. 5A and 5B). The cavity depth is preferably between about 1.5 microns to about 3.0 microns. First side rail 52 has an inner face 62 facing cavity 58 and second side rail 54 has an inner face 64 facing cavity 58. Cavity 58 is bounded by cross rail 48, inner face 62 of first side rail 52, and inner face 64 of second side rail 54.

A center pad 66, a first side pad 68 and a second side pad 70 are positioned proximate to trailing edge 40. Each pad 66, 68 and 70 has a height equal to air bearing surface 46. Center pad 66 is located substantially along the longitudinal axis of slider 20. Transducing head 32 is located on center pad 66. A pole tip 72 of transducing head 32 is located on air bearing surface 46 approximately where the longitudinal axis of slider 20 intersects trailing edge 40. First side pad 68 is located approximately at the intersection between trailing edge 40 and first side edge 42. Preferably, first side pad 68 is connected to first side rail 52. Second side pad 70 is located approximately at the intersection of trailing edge 40 and second side edge 44. Preferably, second side pad 70 is connected to second side rail 64.

A center trench 74, at step depth 56, is positioned within center pad 66. Center trench 74 has a back wall 76 formed by center pad 66, and an inlet 78. Inlet 78 lies closer to leading edge 38 than back wall 76, and inlet 78 is substantially parallel to leading edge 38. An outer perimeter 80, at step depth 56, surrounds center pad 66 and intersects with center trench 74 at inlet 78.

A first side trench 82, at step depth 56, extends into first side pad 68. First side trench 82 has a back wall 84 formed by first side pad 68, and an inlet 86. A second side trench 88, at step depth 56, extends into second side pad 70. Second side trench 88 has a back wall 90 formed by second side pad 70, and an inlet 92. Inlets 86 and 92 lie closer to leading edge 38 then back walls 84 and 90. Inlets 86 and 92 are disposed substantially parallel to leading edge 38. Although the first embodiment of slider 20 is shown having side pads and trenches, additional embodiments of slider 20 may include fewer or more trenches, or even no side pads.

A furrow 94 is positioned within cavity 58 of slider 20. Furrow 94 is recessed from cavity 58 at a furrow depth (shown in FIGS. 5A and 5B). The furrow depth is between about 0.5 microns to about 1.0 microns. Furrow 94 has a width of at least 20 microns. The length of furrow 94 varies by embodiment depending on how much surface area of disc opposing face 36 is desired to be captured. Furrow 94 has a first section 98, and a second section 100 substantially parallel to first section 98. A center section 102 connects first section 98 and second section 100. An end 104 (shown in FIG. 4) of first section 98 and an end 106 of second section 100 intersect trailing edge 40. Furrow 94 is centered about the longitudinal axis of slider 20 and substantially surrounds center pad 66. Preferably, furrow 94 is shaped to follow the air streamlines of slider 20. Furrow 94 is shown having a semi-elliptical shape, however, other shapes are possible as long as the furrow does not have a blunt shape. Although furrow 94 is shown with respect to slider 20 of the first embodiment, the furrow may be utilized with other configurations and embodiments of sliders.

Figure 4:
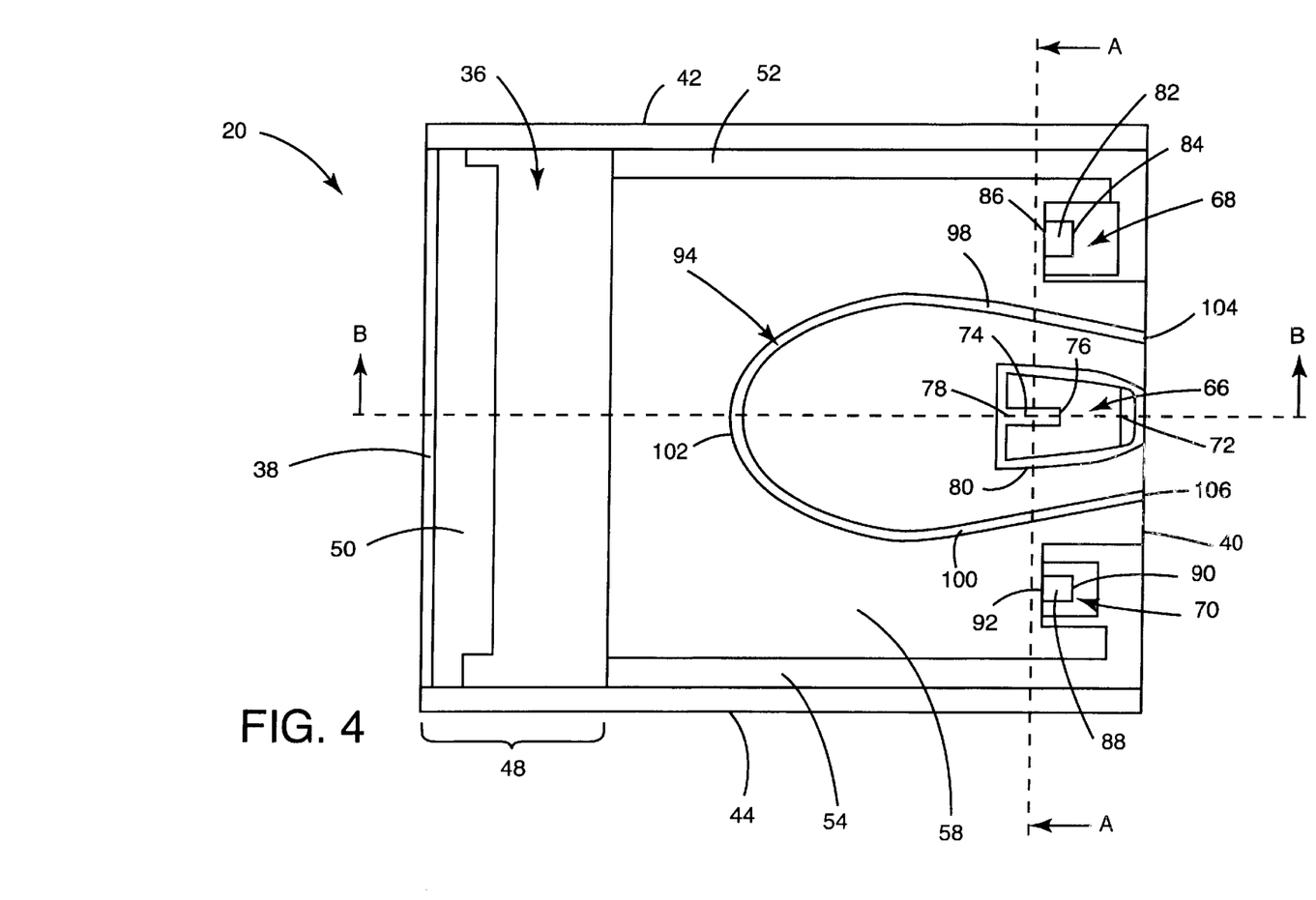
FIG. 4 shows a bottom view of the first embodiment of the slider shown in FIG. 3.
Figure 5A:
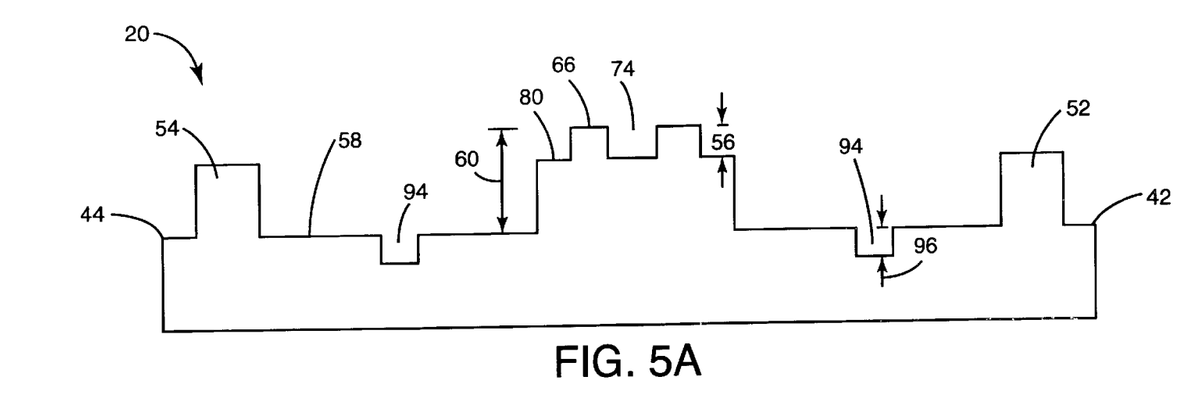
FIG. 5A shows a sectional view of the first embodiment of the slider taken along line A—A of FIG. 4.
Figure 5B:
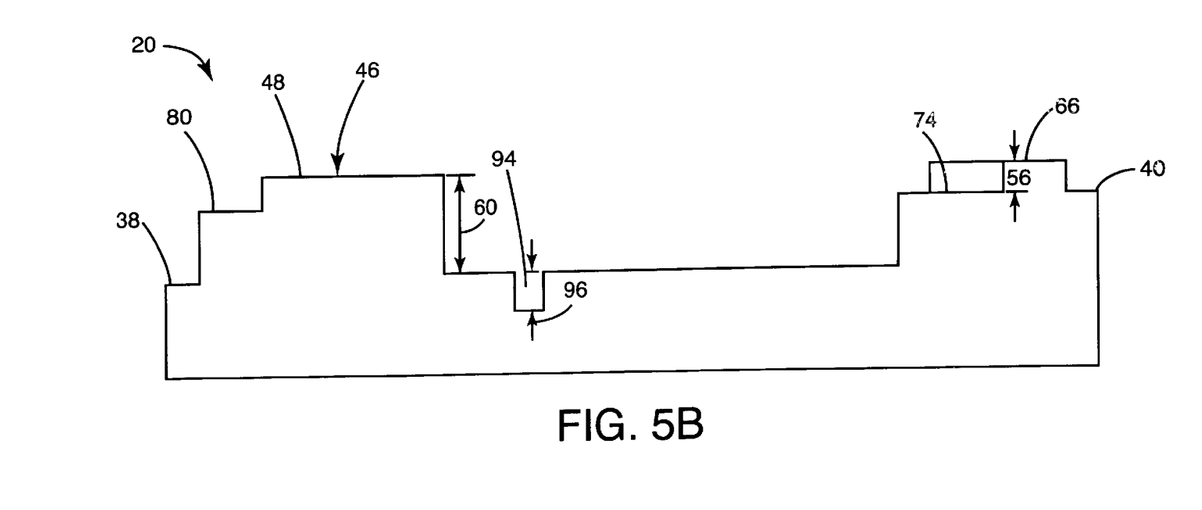
FIG. 5B shows a sectional view of the first embodiment of the slider taken along line B—B of FIG. 4.

FIG. 4 shows a bottom view of slider 20. FIG. 5A is a cross sectional view of slider 20 taken along line A—A of FIG. 4 and FIG. 5B is a cross sectional view of slider 20 taken along line B—B of FIG. 4. FIGS. 5A and 5B illustrate the contours of disc opposing face 36 of the first embodiment of slider 20. Slider 20 has air bearing surface 46 which is the tallest surface of slider 20 and provides a reference level. Pads 66, 68 and 70, as well as cross rail 48, have a height equal to air bearing surface 46. The trenches (74, 82 and 88), front portion 50 of cross rail 48, side rails 52 and 54, and outer perimeter 80 are recessed from air bearing surface 46 at step depth 56. Cavity 58 is recessed from air bearing surface 46 at a cavity depth 60 and furrow 94 is recessed from cavity 58 at a furrow depth 96.

With reference to FIG. 4, in operation slider 20 slides over the surface disc 24 (FIG. 1) with disc opposing face 36 facing the disc. At startup, the disc rotates about its axis which generates a wind of air immediately adjacent to the surface of the disc. The wind of air flows in relation to disc opposing face 36 of slider 20 from leading edge 38 toward trailing edge 40. The air comes over leading edge 38 and cross rail 48 and then redistributes itself within cavity 58. The air traveling over cross rail 48 generates a negative pressure within cavity 58 behind cross rail 48 and forward of pads 66, 68 and 70. The negative pressure pulls slider 20 downward toward the disc. Suspension 16 (FIG. 1) and flexure 18 (FIG. 1) exert a preload force upon slider 20. The preload force pushes slider 20 downward toward the disc.

For slider 20 to fly at an ultra-low height above the surface of the disc during operation, a force must be generated to lift and maintain slider 20 at a height above the disc. The air traveling through cavity 58 continues towards trailing edge 40 of slider 20. A portion of the air is directed, into trenches 74, 82 and 88. Confining the air within trenches 74, 82 and 88 generates a lift force and increased pressurization on the pads, thereby pushing slider 20 upward and away from the disc. The lift force balances the negative pressure and preload force and enables slider 20 to maintain an ultra-low flying height above disc 24.

Flying slider 20 above the disc at an ultra-low fly height, results in a decreased HMS between transducing head 32 and disc 24 (FIG. 1). As a result of the decreased HMS, during operation of disc drive system 10, contaminants, such as lubricants (lube), and debris accumulate on air bearing surface 44 of slider 20 or in trenches 74, 82 and 88. Lube accumulation on disc opposing face 36 results in flyability and stiction problems for slider 20. Lubricant is typically applied to the disc to prevent corrosion. Accumulation of lube on air bearing surface 44 or within trenches 74, 82 and 88 changes the contours of disc opposing face 36, thereby inducing a loss of fly height and intermittent contact between transducing head 32 and the disc, until finally slider 20 crashes. When lube accumulates on slider 20, a friction is created between the slider and lube on the disc. The lube acts as an adhesive between the slider and the disc. When the disc begins rotating, the motor does not have enough torque to overcome the stiction force between the disc and the slider, thereby resulting in poor takeoff performance of slider 20 or the inability to takeoff.

Preferably, the fly height of slider 20 is less than 0.5 microns. Particles that accumulate on disc opposing face 36 of slider 20 are usually larger than the fly height. The large particles, or other debris, enter the air bearing gap or accumulate on air bearing surface 44 and either embed into the disc surface or cause a bump in the disc surface. Particle contamination results in a loss of data or a skip write, otherwise known as a head bounce. Particles embedded into the disc surface cause data stored on the disc to be lost or a head bounce to occur. A particle forming a bump on the disc results in a head bounce or the particle becoming embedded further into the disc. During a head bounce, slider 20 contacts the bump, bounces upward and stops modulating, thereby preventing slider 20 from writing or reading to or from the disc.

The present invention slider 20 includes furrow 94. Furrow 94 provides a channel which captures contaminants and expels them from disc opposing face 36. As air flows over disc opposing face 36 of slider 20, the air travels over leading edge 38 and cross rail 48 and redistributes itself within cavity 58 to generate a negative pressure within cavity 58 behind cross rail 48 and forward of pads 66, 68 and 70. The pressure within furrow 94 is lower than the pressure within cavity 98. Preferably, furrow 94 has a slightly lower pressure than the neighboring area of cavity 58. Furrow 94 however, does not displace the negative pressure within cavity 58. Furrow 94 generates a suction force to pull the contaminants into the furrow.

Once the contaminants are captured by furrow 94, the air streamline flowing over disc opposing face 36 from leading edge 38 to trailing edge 40 flushes the contaminants from slider 20. The contaminants are propelled through furrow 94 toward trailing edge 40 and expelled from slider 20 through ends 104 and 106 of furrow 94. Preferably, furrow 94 is shaped to follow the air streamline so that the air flow can follow furrow 94 and flush the contaminants from furrow 94. A blunt shaped furrow, or one that does not follow the air streamline, will not flush contaminants from the furrow because the furrow shape does not follow or turn in conjunction with the air flow pattern.

Furrow depth 96 is preferably between approximately 0.5 microns and 1.0 microns. Generally, the deeper furrow 94 is, the more effective it is in capturing and expelling contaminants from slider 20. However, a furrow depth greater than approximately 1.0 microns displaces the negative pressure within cavity 58 and has a detrimental effect on slider fly height. Since contaminants are usually smaller than furrow depth 96, a furrow depth greater than 1.0 microns is not necessary.

Furrow 94 prevents the accumulation of contaminants and debris on air bearing surface 44 or within trench 74 by capturing the contaminants before they reach pad 66 and expelling them from slider 20. Furrow 94 provides a shield around air bearing surface 44, in particular center pad 66, to protect that area. Furrow 94 prevents contaminants from reaching center pad 66.

Although furrow 94 is shown in the center of cavity 58 and substantially surrounding center pad 66, the furrow location is not restricted to that area or size. The furrow may be placed where appropriate on disc opposing face 36 to provide a preferential path for contaminants to be expunged from slider 20 and to prevent contaminants from accumulating on particular air bearing surfaces of slider 20. Furthermore, the length of the furrow may vary depending on how much surface area of cavity 58 is desired for capturing contaminants. Additionally, the furrow of the present invention may be used in different slider embodiments to prevent the accumulation of contaminants and debris on the air bearing surface of the slider. Preferably, furrows prevent contaminants and debris from reaching the center pad air bearing surface and the side rail air bearing surface (if used in a particular embodiment).

Figure 6:
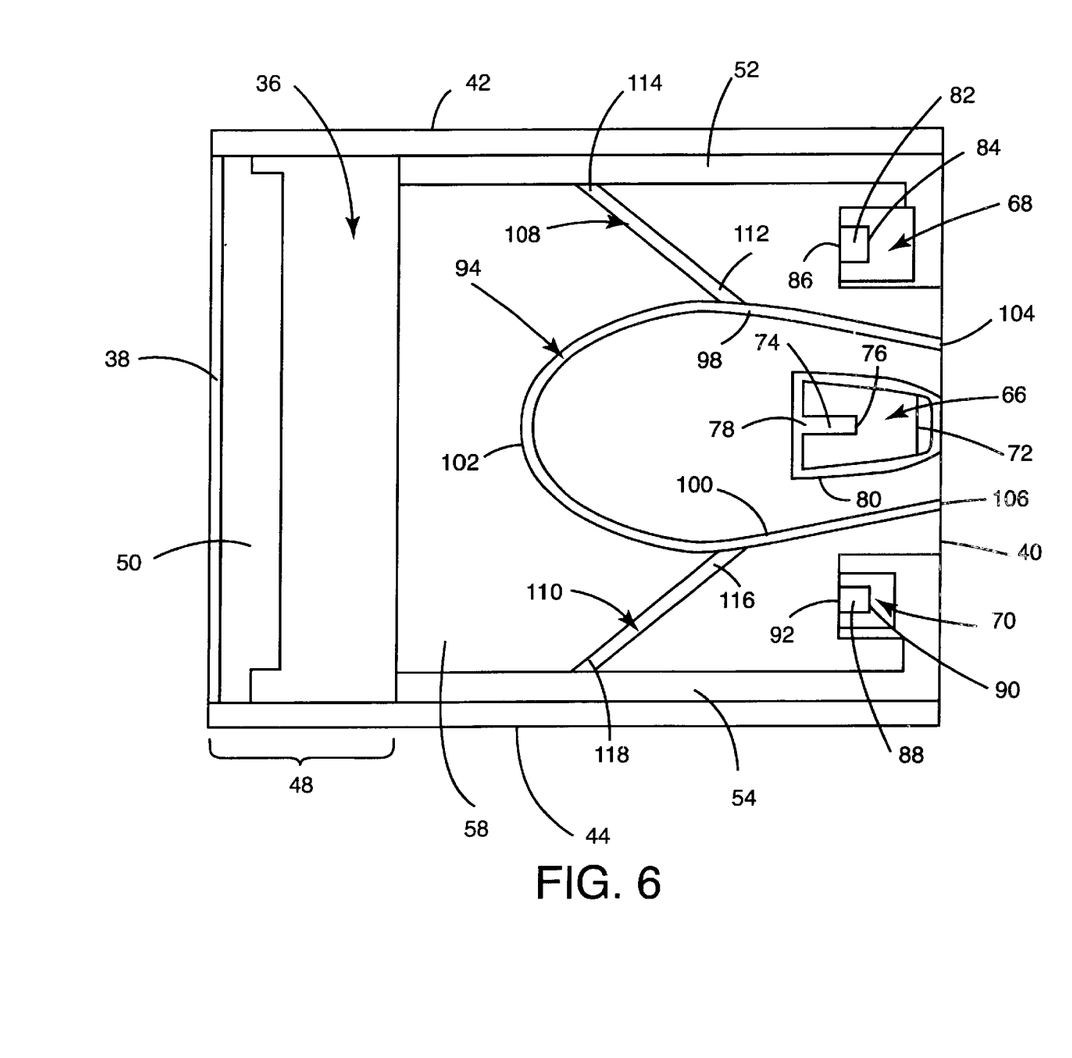
FIG. 6 shows a bottom view of a second embodiment of the slider of the present invention.

A second embodiment of slider 20 is shown in FIG. 6. The second embodiment of slider 20 has the same basic structure as described with respect to the first embodiment in FIGS. 3 and 4. FIG. 6 shows a bottom view of the second embodiment of slider 20. The second embodiment further includes a first side arm 108 and a second side arm 110.

First and second side arms 108 and 110 are recessed from cavity 58 at furrow depth 96. Preferably, first and second side arms 108 and 110 extend between first and second side rails 52 and 54, respectively, and furrow 94. First side arm 108 has a first end 112 and a second end 114. First end 112 of first side arm 108 intersects first section 98 of furrow 94 and second end 114 intersects first side rail 52. Second side arm 110 has a first end 116 and a second end 118. First end 116 of second side arm 110 intersects second section 100 of furrow 94 and second end 118 of second side arm 110 intersects second side rail 54. The effectiveness of side arms 108 and 110 is decreased if side arms 108 and 110 do not extend to side rails 52 and 54, respectively, because some area is left for contaminants to travel across and accumulate on air bearing surface 44.

First side arm 108 preferably extends from furrow 94 relative to the longitudinal axis at a positive angle greater than zero degrees and less than 90 degrees, and in the second embodiment of slider 20, first side arm 108 extends from furrow 94 at a positive angle of approximately 40 degrees. Second side arm 110 preferably extends from furrow 94 relative to the longitudinal axis at a negative angle greater than zero degrees and less than 90 degrees, and in the second embodiment second side arm 110 extends from furrow 94 at a negative angle of approximately 40 degrees. Although side arms 108 and 110 are shown having a particular angle, it is important that the angle of the side arms is determined based on the airflow's ability to flush and direct particles into furrow 94, and thereby off slider 20.

First and second side arms 108 and 110 prevent lube and other contaminants from accumulating in side trenches 82 and 88 and on side pads 68 and 70. Preferably, first and second side arms 108 and 110 are used when side pads 68 and 70 are located inside of side rails 52 and 54. Other embodiments of slider 20 without side pads 68 and 70 or side trenches 82 and 88, first and second side arms 108 and 110 would not be required.

Side arms 108 and 110 capture contaminants passing across disc opposing face 36, and cavity 58, and expel them from slider 20. The pressure within side arms 108 and 110 is lower than the pressure within cavity 58 and creates a suction force to pull the contaminants into side arms 108 and 110. Once the contaminants are captured by side arms 108 and 110, the air stream flowing over disc opposing face 36 from leading edge 38 to trailing edge 40 propels the contaminants through furrow 94 and expels them from slider 20 through ends 104 and 106 of furrow 94.

Figure 7:
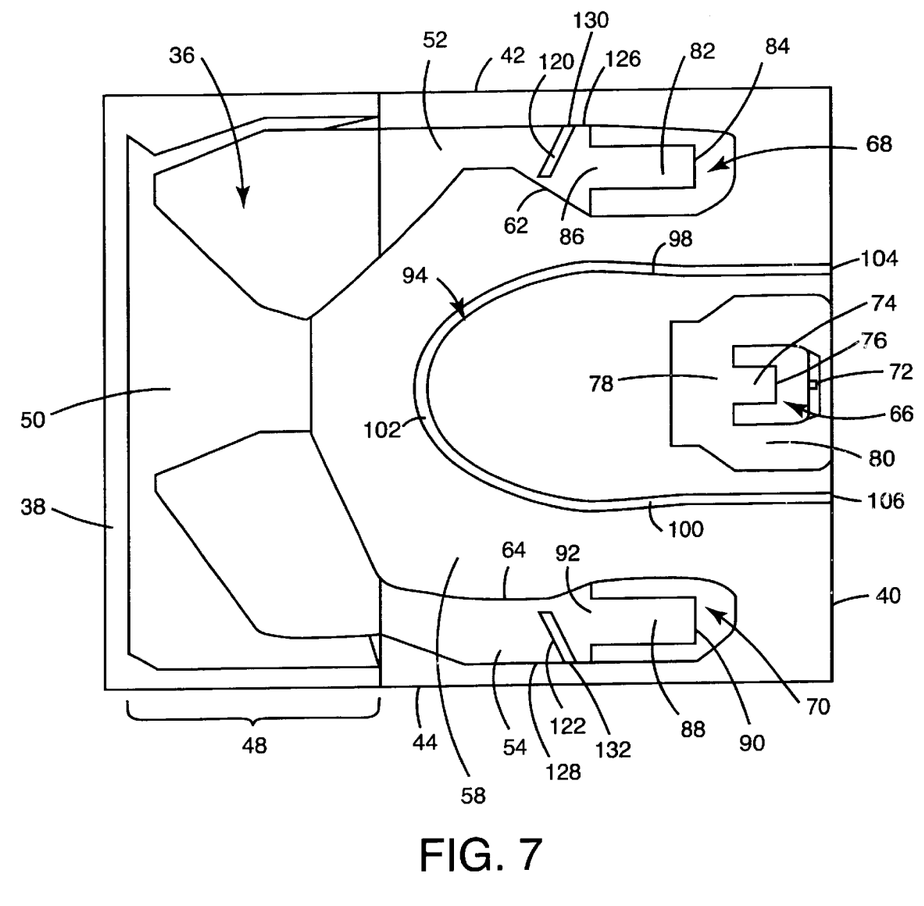
FIG. 7 shows a third embodiment of the slider of the present invention.

A third embodiment of slider 20 is shown in FIG. 7. The third embodiment of slider 20 has the same basic structure as described with respect to the first embodiment in FIGS. 3 and 4. FIG. 7 shows a bottom perspective view of the third embodiment of slider 20 with front portion 50. The third embodiment of slider 20 includes disc opposing face 36, cross rail 48, side rails 52 and 54, cavity 58, pads 66, 68 and 70, and trenches 74, 84 and 88. The third embodiment of slider 20 further includes a first side furrow 120 and a second side furrow 122 disposed on first and second side rails 52 and 54, respectively.

First side furrow 120 is positioned on first side rail 52 forward of first side pad 68 and first side trench 82. Second side furrow 122 is positioned on second side rail 54 forward of second side pad 70 and second side trench 88. First and second side furrows 120 and 122 are recessed from step depth 56 (the height of side rails 52 and 54) at a side furrow depth. The side furrow depth is preferably between about 0.5 microns and 1.0 microns.

First side rail 52 has an outer edge 126 adjacent first side edge 42 and second side rail 54 has an outer edge 128 adjacent second side edge 44. First side furrow 120 has an end 130 and second side furrow 122 has an end 132. End 130 of first side furrow 120 intersects outer edge 126 of first side rail 52. First side furrow 120 preferably extends relative to first side edge 42 of slider 20 at a negative angle greater than zero degrees and less than 90 degrees, and in the third embodiment, first side furrow 120 extends at a negative angle of approximately 65 degrees. End 132 of second side furrow 122 intersects outer edge 128 of second side rail 54. Second side furrow 122 extends relative to second side edge 44 of slider 20 at a positive angle preferably greater than zero degrees and less than 90 degrees, and in the third embodiment, second side furrow 122 extends at a positive angle of approximately 65 degrees. Although in FIG. 7 side furrows 120 and 122 are shown having a particular angle, it is important that the angle of the side furrows is determined such that the airflow can flush and direct particles outwards, and thereby off slider 20.

First and second side furrows 120 and 122 prevent lube and other contaminants from accumulating in trenches 82 and 88 and on side pads 68 and 70. Preferably first and second side furrows 120 and 122 are used when side pads 68 and 70 are located along side rails 52 and 54. In other embodiments of slider 20, side furrows 120 and 122 would not be used simultaneously with side arms 108 and 110 (shown in FIG. 6), nor when there are no side pads 68 and 70 would first and second side arms 108 and 110 be required. The determination of whether side arms 108 and 110 or side furrows 120 and 122 are used to protect side pads 68 and 70 from contaminant accumulation depends on the location of air bearing surface 44.

Side furrows 120 and 122 capture contaminants passing across disc opposing face 36 and expel them from slider 20. The pressure within side furrows 120 and 122 is lower than the pressure in the neighboring area of side rails 52 and 54. Side furrows 120 and 122 generate a suction force and pull the contaminants into the side furrows. Once the contaminants are captured by side furrows 120 and 122, the air streamlines flowing over disc opposing face 36 from leading edge 38 to trailing edge 40 flush the contaminants from slider 20. The contaminants are propelled through side furrows 120 and 122 toward either first side edge 42 or second side edge 44, respectively, and expelled from slider 20 through ends 130 and 132 of side furrows 120 and 122.

In another preferred embodiment of the present invention, first and second side furrows are positioned on the first and second side rails, respectively. However, the first and second side furrows extend inward towards the trailing edge and contact the inner faces of the side rails, but do not contact the outer edges of the side rails. The side furrows extend relative to the longitudinal axis of the slider. Contaminants and debris captured by the side furrows are flushed into the cavity where they are expelled from the slider through the cavity or the furrow recessed from the cavity.

Accumulation of contaminants, such as lubricant, and debris on an air bearing surface of a slider, or within trenches, results in poor performance by the slider. The detrimental effects include fatal crashes of the slider into the disc, the inability of the slider to takeoff from the disc, loss of data on the disc and the inability of the slider to write or read from the disc. The present invention slider prevents contaminants from accumulating on the air bearing surface of the slider. The present invention slider includes a furrow located on the disc opposing face of the slider. Furrows may be located either in the cavity of the slider and/or along the side rails. The pressure within the furrow is lower than the neighboring area and generates a suction force to capture contaminants passing over the disc opposing face of the slider. Once captured by the furrows, the contaminants are propelled through the furrow and expunged from the slider. Furrows have the most benefit when located in the cavity of the slider or towards the trailing edge forward of the air bearing surface. The present invention slider, with the furrow, improves the performance of the slider without increasing the manufacturing costs for the slider.

Although the present invention has been described with reference to preferred embodiments, workers skilled in the art will recognize that changes may be made in form and detail without departing from the spirit and scope of the invention. For example, other embodiments of the slider utilizing furrows are possible. The furrows of the present invention may be used in other slider embodiments to prevent the accumulation of contaminants and debris on the air bearing surface of the slider. The furrows may be located at any location of the slider and on any surface of the slider, including the air bearing surface or a milled surface (i.e., at step or cavity depth). Preferably, the furrows will prevent contaminants and debris from accumulating on a center pad's air bearing surface and also on a side rail's air bearing surface (if used in a particular slider embodiment).

What is claimed is:

1. A slider for supporting a transducing head proximate a rotating disc, the slider comprising:
   a slider body having a disc opposing face bounded by a leading edge and a trailing edge, the slider body having an air bearing surface defined on the disc opposing face;
   a cavity recessed from the air bearing surface; and
   means for capturing contaminants on the slider body and expunging the contaminants at the trailing edge of the slider body.

2. The slider of claim 1 wherein the means for capturing and expunging contaminants on the slider body comprises a furrow formed in and recessed from the cavity.

3. A slider for supporting a transducing head proximate a rotating disc, the slider comprising:
   a slider body having a disc opposing face bounded by a leading edge, a trailing edge and first and second side edges, the slider body having a longitudinal axis;
   an air bearing surface defined on the disc opposing face;
   a cavity recessed from the air bearing surface at a cavity depth; and
   a furrow recessed from the cavity for flushing contaminants towards the trailing edge of the slider body.

4. The slider of claim 3 wherein the furrow has a furrow depth of about 0.5 microns to about 1.0 microns.

5. The slider of claim 3 wherein the cavity depth is about 1.5 microns to about 3.0 microns.

6. The slider of claim 3 wherein the furrow has a first end and a second end, the first and second ends lying adjacent the trailing edge of the slider body such that the furrow has a semi elliptical shape.

7. The slider of claim 6 wherein the furrow is centered about the longitudinal axis.

8. The slider of claim 3, and further comprising:
   a first side arm and a second side arm extending from the furrow, the first side arm extending relative to the longitudinal axis at a positive angle greater than zero degrees and less than 90 degrees and the second side arm extending relative to the longitudinal axis at a negative angle greater than zero degrees and less than 90 degrees.

9. The slider of claim 3, and further comprising:
   first and second side rails positioned substantially along the first and second side edges.

10. The slider of claim 9 wherein the first and second side rails are recessed from the air bearing surface at a step depth.

11. The slider of claim 10 wherein the step depth is about 0.1 microns to about 0.3 microns.

12. The slider of claim 10, and further comprising:
   a first side furrow disposed in the first side rail, the first side furrow being recessed from the step depth at a side furrow depth and the first side furrow extending relative to the first side edge at a negative angle greater than zero degrees and less than 90 degrees; and
   a second side furrow disposed in the second side rail, the second side furrow being recessed from the step depth at the side furrow depth and the second side furrow extending relative to the second side edge at a positive angle greater than zero degrees and less than 90 degrees.

13. The slider of claim 12 wherein the side furrow depth is about 0.5 microns to about 1.0 microns.

14. The slider of claim 10, and further comprising:
   a first side furrow disposed in the first side rail, the first side furrow being recessed from the step depth at a side furrow depth and the first side furrow extending relative to the longitudinal axis at a positive angle greater than zero degrees and less than 90 degrees; and
   a second side furrow disposed in the second side rail, the second side furrow being recessed from the step depth at the side furrow depth and the second side furrow extending relative to the longitudinal axis at a negative angle greater than zero degrees and less than 90 degrees.

15. The slider of claim 3 wherein the furrow has a width of at least about 20 microns.

16. A slider for supporting a transducing head proximate a rotating disc, the slider comprising:

a slider body having a disc opposing face bounded by a leading edge, a trailing edge and first and second side edges, the slider body having a longitudinal axis;

an air bearing surface defined on the disc opposing face, the air bearing surface having at least one pad behind the leading edge;

a cavity recessed from the air bearing surface at a cavity depth, at least a portion of the cavity preceding the pad; and a furrow for flushing contaminants towards the trailing edge of the slider body, the furrow formed in the cavity.

17. The slider of claim 16, and further comprising a first side arm and a second side arm extending from the furrow, the first side arm extending relative to the longitudinal axis at a positive angle greater than zero degrees and less than 90 degrees and the second side arm extending relative to the longitudinal axis at a negative angle greater than zero degrees and less than 90 degrees.

18. The slider of claim 16, and further comprising first and second side rails positioned substantially along the first and second side edges wherein the first and second side rails are recessed from the air bearing surface at a step depth.

19. The slide of claim 18, and further comprising a first side furrow disposed in the first side rail and a second side furrow disposed in the second side rail wherein the first and second side furrows are recessed from the step depth at a side furrow depth.

20. The slider of claim 19 wherein the first side furrow extends relative to the first side edge at a negative angle greater than zero degrees and less than 90 degrees and the second side furrow extends relative to second side edge at a positive angle greater than zero degrees and less than 90 degrees.

21. The slider of claim 19 wherein the first side furrow extends relative to the longitudinal axis at a positive angle greater than zero degrees and less than 90 degrees and the second side furrow extends relative to the longitudinal axis at a negative angle greater than zero degrees and less than 90 degrees.

* * * * *